US 12,401,847 B2

(12) United States Patent
Abhishek et al.

(10) Patent No.: US 12,401,847 B2
(45) Date of Patent: Aug. 26, 2025

(54) MAPPING ARCHITECTURE OF IMMERSIVE TECHNOLOGIES MEDIA FORMAT (ITMF) SPECIFICATION WITH RENDERING ENGINES

(71) Applicant: TENCENT AMERICA LLC, Palo Alto, CA (US)

(72) Inventors: Rohit Abhishek, Kansas City, MO (US); Arianne Hinds, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/639,528

(22) Filed: Apr. 18, 2024

(65) Prior Publication Data
US 2024/0298067 A1 Sep. 5, 2024

Related U.S. Application Data

(63) Continuation of application No. 18/075,037, filed on Dec. 5, 2022, now Pat. No. 11,985,381.

(60) Provisional application No. 63/298,110, filed on Jan. 10, 2022.

(51) Int. Cl.
H04N 21/44 (2011.01)

(52) U.S. Cl.
CPC ............... H04N 21/44012 (2013.01)

(58) Field of Classification Search
None
See application file for complete search history.

(56) References Cited

U.S. PATENT DOCUMENTS

| | | |
|---|---|---|
| 2007/0005795 A1 | 1/2007 | Gonzalez |
| 2011/0032334 A1 | 2/2011 | Raveendran et al. |
| 2019/0028691 A1 | 1/2019 | Hinds et al. |
| 2019/0114830 A1 | 4/2019 | Bouazizi et al. |
| 2020/0128178 A1 | 4/2020 | Shi |
| 2021/0392386 A1 | 12/2021 | Hinds |
| 2021/0409818 A1 | 12/2021 | Bouazizi et al. |

OTHER PUBLICATIONS

Erwan J. David et al., "A Dataset of Head and Eye Movements for 360° Videos", MMSys'18, Proceedings of the 9th ACM Multimedia Systems Conference, Jun. 12-15, 2018, Amsterdam, Netherlands, pp. 432-437 (6 pages total).
Omar A. Niamut et al., "Towards a Format-agnostic Approach for Production, Delivery and Rendering of immersive Media", MMSys '13: Proceedings of the 4lh ACM Multimedia Systems Conference, 2013, pp. 249-260 (12 pages total).
International Search Report dated Mar. 15, 2023 issued in International Application No. PCT/US2022/052944.
Written Opinion dated Mar. 15, 2023 issued in International Application No. PCT/US2022/052944.

Primary Examiner — Omar S Parra
(74) Attorney, Agent, or Firm — Sughrue Mion, PLLC

(57) ABSTRACT

A method including parsing a scene file to extract relevant scene file data; sending the relevant scene file data to a converter; translating, by the converter, the relevant scene file data into a format compatible with a respective rendering engine; mapping the translated scene file data using the respective rendering engine into a scene representation, wherein the scene representation is compatible with an Immersive Technologies Media Format (ITMF).

20 Claims, 5 Drawing Sheets

MAPPING ARCHITECTURE OF IMMERSIVE TECHNOLOGIES MEDIA FORMAT (ITMF) SPECIFICATION WITH RENDERING ENGINES

CROSS-REFERENCE TO RELATED APPLICATIONS

This application is a Continuation of U.S. application Ser. No. 18/075,037 filed Dec. 5, 2022, which is based on and claims priority to U.S. Patent Application No. 63/298,110, filed on Jan. 10, 2022, the disclosure of which are incorporated herein by reference in their entireties.

TECHNICAL FIELD

The present disclosure relates to architectural mapping of ITMF specification with scene representations of various rendering engines.

BACKGROUND

Immersive media include immersive technologies that attempt to create, or imitate the physical world through digital simulation, thereby simulating any or all human sensory systems to create the perception of the user being physically present inside the scene.

There are different types of immersive media technologies currently in play: Virtual Reality (VR), Augmented Reality (AR), Mixed Reality (MR), Light Field/Holographic, etc. VR refers to a digital environment replacing the user's physical environment by using a headset to place the user in a computer-generated world. AR, on the other hand, takes digital media and layers them on the real world around you by using either a clear vision or a smartphone. MR refers to the blending of the real world with the digital world, thereby creating an environment in which technology and the physical world can co-exist.

Lightfield/Holographic technologies consist of light rays in 3D space with rays coming from each point and direction. This is based on the concept that everything seen around is illuminated by light coming from any source, traveling via space and hitting the object's surface where the light is partly absorbed and partly reflected to another surface before reaching our eyes. Having a light field properly reproduced will provide the user with 3D effects such as binocularity and continuous motion parallax. The underlying concept beneath lightfield displays is the massive array of projection modules projecting light rays onto a holographic screen to reproduce the approximation of the lightfield by showing different but consistent information in slightly different directions.

The open-source Immersive Technologies Media Format (ITMF) based on ORBX and specified by the Immersive Digital Experience Alliance (IDEA) is a robust scene description centered on photorealistic application for immersive media. ITMF is focused on both the content composition workflow and transmission for network-based rendering over a media-aware network, progressive download and/or streaming for immersive media. ITMF is intended for use within DCC tools where individual assets such as textures and meshes are completed before import within the Scene Graph. A methodology for mapping ITMF specification with different rendering engines is needed.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for wire formats for segmented media metadata for parallel processing in a cloud platform are disclosed by the present disclosure.

According to some embodiments, there is provided a method executed by at least one processor. The method includes parsing a scene file to extract relevant scene file data. The method further includes sending the relevant scene file data to a converter. The method further includes translating, by the converter, the relevant scene file data into a format compatible with a respective rendering engine. The method further includes mapping the translated scene file data using the respective rendering engine into a scene representation, wherein the scene representation is compatible with an Immersive Technologies Media Format (ITMF).

According to some embodiments, an apparatus includes at least one memory configured to store program code and at least one processor configured to read the program code and operate as instructed by the program code. The program code includes parsing code configured to cause the at least one processor to parse a scene file to extract relevant scene file data. The program code further includes sending code configured to cause the at least one processor to send the relevant scene file data to a converter. The program code further includes translating code configured to cause the at least one processor to translate, by the converter, the relevant scene file data into a format compatible with a respective rendering engine. The program code further includes mapping code configured to cause the at least one processor to map the translated scene file data using the respective rendering engine into a scene representation, wherein the scene representation is compatible with an Immersive Technologies Media Format (ITMF).

According to some embodiments, a non-transitory computer-readable storage medium, stores instructions that, when executed by at least one processor, cause the at least one processor to parse a scene file to extract relevant scene file data. The instructions further cause the at least one processor to send the relevant scene file data to a converter. The instructions further cause the at least one processor to translate, by the converter, the relevant scene file data into a format compatible with a respective rendering engine. The instructions further cause the at least one processor to map the translated scene file data using the respective rendering engine into a scene representation, wherein the scene representation is compatible with an Immersive Technologies Media Format (ITMF).

Additional embodiments will be set forth in the description that follows and, in part, will be apparent from the description, and/or may be learned by practice of the presented embodiments of the disclosure.

BRIEF DESCRIPTION OF DRAWINGS

The above and other aspects, features, and aspects of embodiments of the disclosure will be apparent from the following description taken in conjunction with the accompanying drawings, in which.

DETAILED DESCRIPTION

Figure 1:
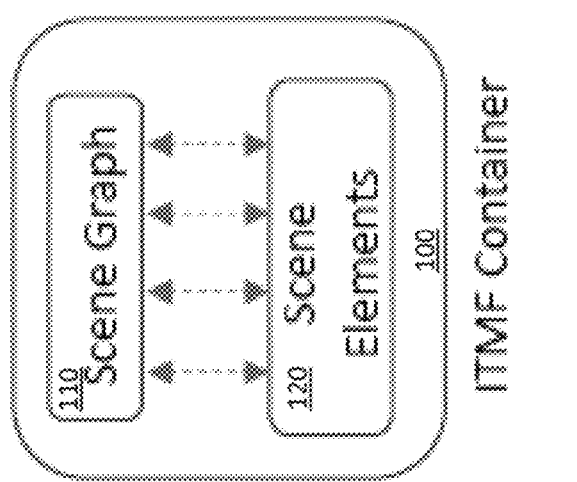
FIG. 1 is an example ITMF container, according to some embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

ITMF is a node based hierarchical scene graph with nodes that have both input and output pins. Pins enable relationships between nodes. In addition, nodes have attributes defining intrinsic and immutable characteristics of the object. Nodes have many types including cameras, geometry, lighting, materials, textures, and more which feed into a render target node. Each node has input and output pins enabling for connections to be created and supported. The render target node has parameters which enable ray tracing for photorealistic rendering within an unbiased rendering application. Within a media and device aware network, the render target node's design with a render target can be adapted to the target device which includes legacy 2D/3D displays, virtual and augmented reality headset as well as emerging volumetric and light field displays.

The entire scene contents may be binary encoded within a Binary Markup Language (BML) Container and the description of the scene may be serialized with unique node identifiers and connection relationships in XML based scene graph. Within the container, logical units encoding geometry, texture, and more imported assets listed by directory and index units enable random access and compression/encryption of individual units. The design of the container enables for additional file types to be encoded within the logical units for decoding and on as needed basis.

In some embodiments, the ITMF scene graph may be a node-based, directed acyclic graph that describes logical, temporal, and spatial relationships between visual objects in a scene. The graph may be expressed entirely as a human-readable XML file. Both legacy and emerging, advanced imaging (e.g., volumetric, holographic, light field) display technologies can be supported with the ITMF scene graph. In FIG. 1, each of the scene elements 120 that are referenced by a scene graph 110, and the XML file for the graph itself, may be aggregated and stored into an ITMF container 100.

After the ITMF scene file is rendered to the end client; if the end client's renderer engine does not support the scene file, the ITMF scene file would need to be mapped to a scene graph of the end point's supported file.

Figure 2:
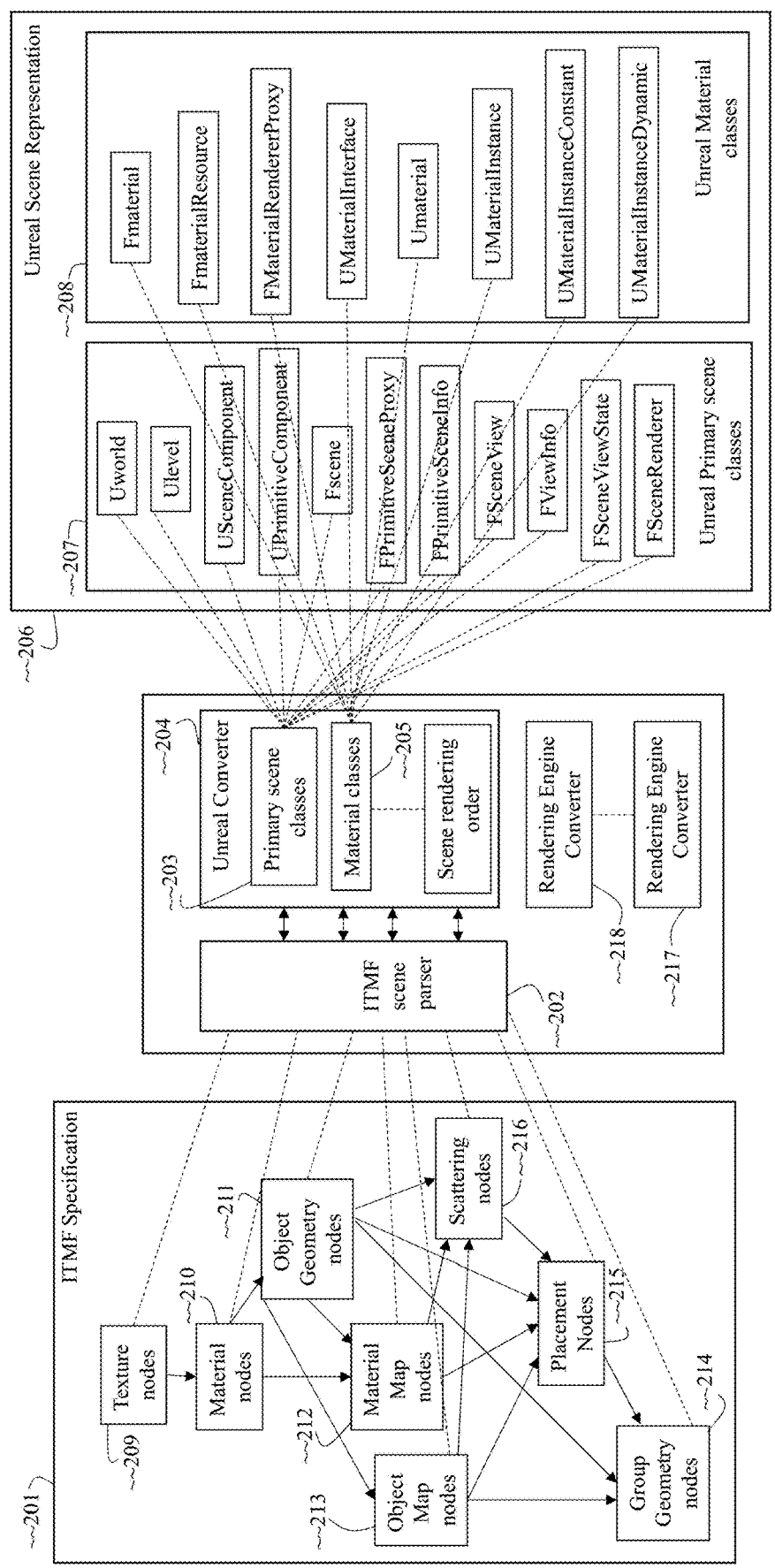
FIG. 2 is an example ITMF mapping architecture, according to some embodiments.

The architectural framework for converting ITMF specification into various end point's representation is shown in FIG. 2. The ITMF specification 201 may be mapped to unreal (virtual) converter 204. The ITMF scene parser 202 may be responsible for parsing the scene file, e.g., extracting relevant information such as scene assets, materials, geometry, rendering path from the ITMF container by parsing the scene graph and scene elements. The parsed data is then sent to a converter, which translates the data into a format understood by the respective rendering engine. ITMF scene parser 202, which after receiving the data from ITMF specification modules 209, 210, 211, 212, 213, 214, 215, and 216, may parse the ITMF specification 201 in a structural way so as to convert the ITMF specification 201 into relevant rendering engine format. Unreal converter 204 along with rendering engine converters 217 and 218 translate the parsed ITMF file into equivalent rendering engine format.

The unreal converter 204, including rendering engine converters 217 and 218, may be responsible for mapping the parsed ITMF scene into an equivalent unreal scene representation 206 where the data is arranged into various scene representation classes such as unreal primary scene classes 207 and unreal material classes 208 as understood by the rendering engine converters 217 and 218.

Figure 3:
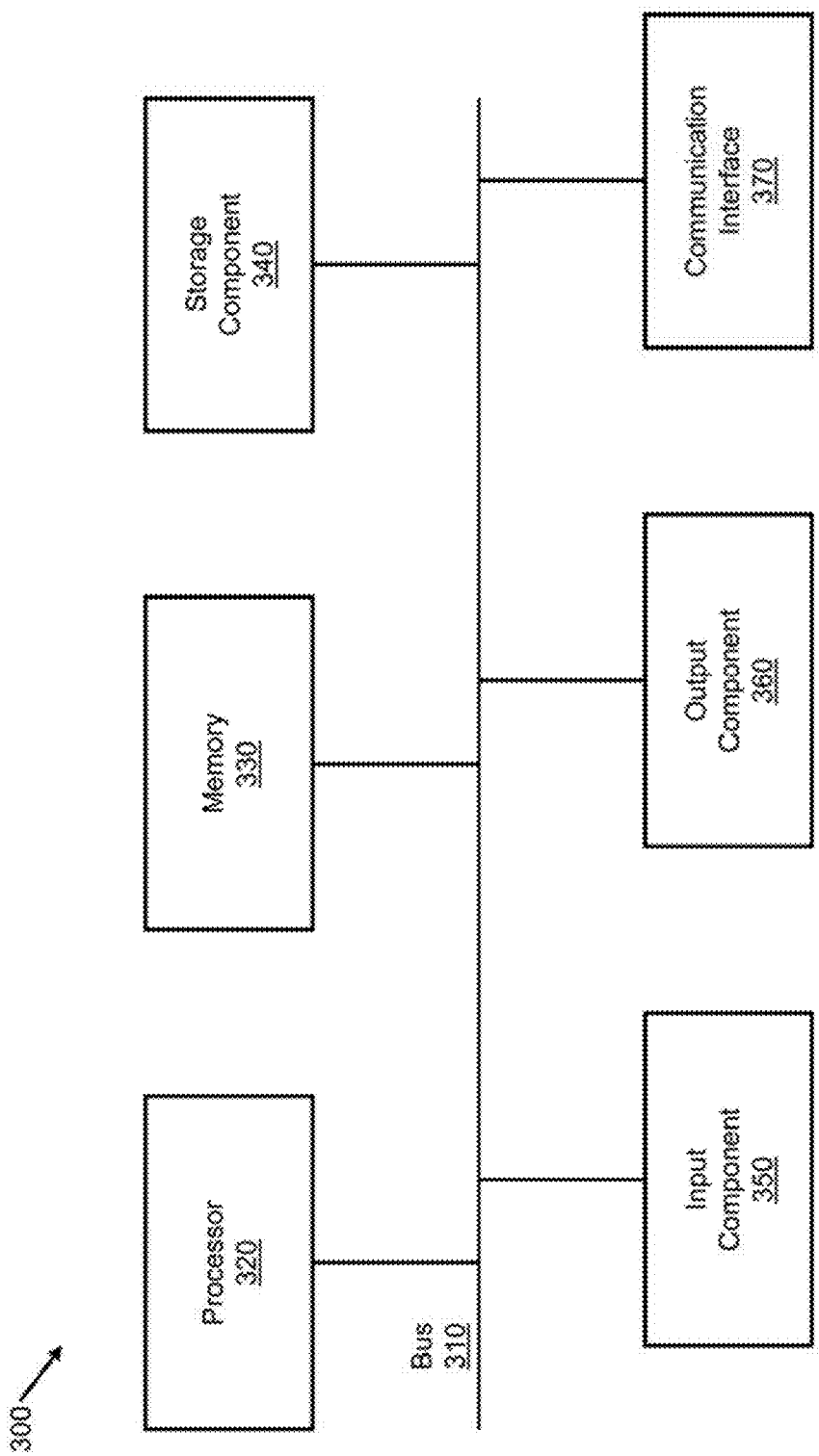
FIG. 3 is a diagram of an example environment in which systems and/or methods, described herein, may be implemented.

FIG. 3 is a block diagram of example components of one or more devices according to some embodiments.

A device 300 may correspond to a user device and/or a platform. As shown in FIG. 3, the device 300 may include a bus 310, a processor 320, a memory 330, a storage component 340, an input component 350, an output component 360, and a communication interface 370.

The bus 310 may include a component that permits communication among the components of the device 300. The processor 320 is implemented in hardware, firmware, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some embodiments, the processor 320 may include one or more processors capable of being programmed to perform an operation. The memory 330 may include a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 may include a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 may include a component that provides output information from the device 300 (e.g., a display, a speaker, and/or one or more light-emitting diodes (LEDs)).

The communication interface 370 may include a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes based on the processor 320 executing software instructions stored by a non-transitory computer-readable medium, such as the memory 330 and/or the storage component 340. A computer-readable medium is defined herein as a non-transitory memory device. A memory device may include memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more operations described as being performed by another set of components of the device 300.

Figure 4:
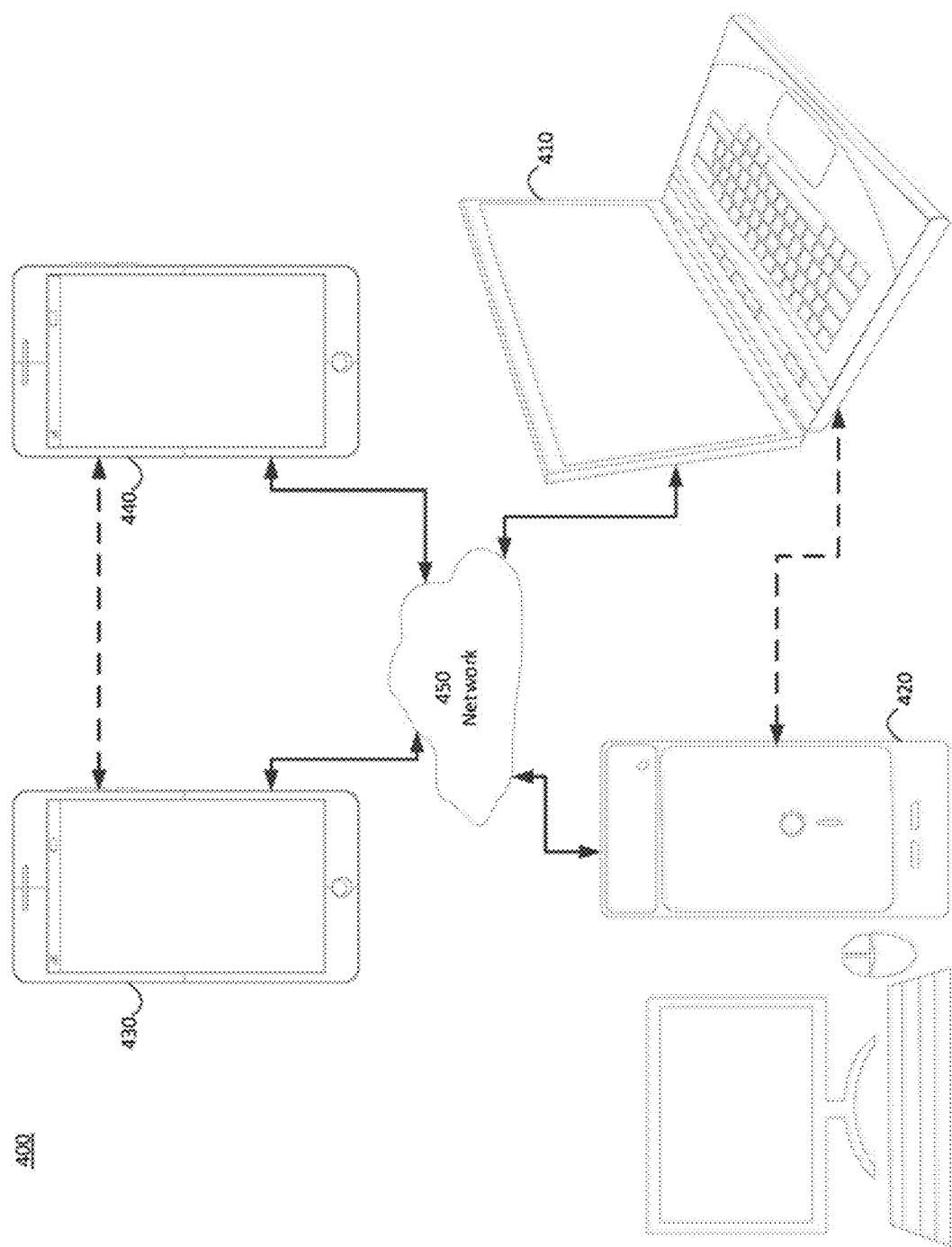
FIG. 4 is a simplified block diagram of a communication system, according to some embodiments.

FIG. 4 illustrates a simplified block diagram of a communication system 400 according to some embodiments of the present disclosure. The communication system 400 may include at least two terminals 410-420 interconnected via a network 450. For unidirectional transmission of data, a first terminal 410 may code video data at a local location for transmission to the other terminal 420 via the network 450. The second terminal 420 may receive the coded video data of the other terminal from the network 450, decode the coded data, and display the recovered video data. Unidirectional data transmission may be common in media serving applications and the like.

FIG. 4 illustrates a second pair of terminals 430, 440 provided to support bidirectional transmission of coded video that may occur, for example, during videoconferencing. For bidirectional transmission of data, each terminal 430, 440 may code video data captured at a local location for transmission to the other terminal via the network 450. Each terminal 430, 440 also may receive the coded video data transmitted by the other terminal, may decode the coded data and may display the recovered video data at a local display device.

In FIG. 4, the terminals 410-440 may be illustrated as servers, personal computers and smart phones but the principles of the present disclosure are not so limited. Embodiments of the present disclosure find application with laptop computers, tablet computers, media players and/or dedicated video conferencing equipment. The network 450 represents any number of networks that convey coded video data among the terminals 410-440, including for example wireline and/or wireless communication networks. The communication network 450 may exchange data in circuit-switched and/or packet-switched channels. Representative networks include telecommunications networks, local area networks, wide area networks, and/or the Internet. For the purposes of the present discussion, the architecture and topology of the network 450 may be immaterial to the operation of the present disclosure unless explained herein below.

Figure 5:
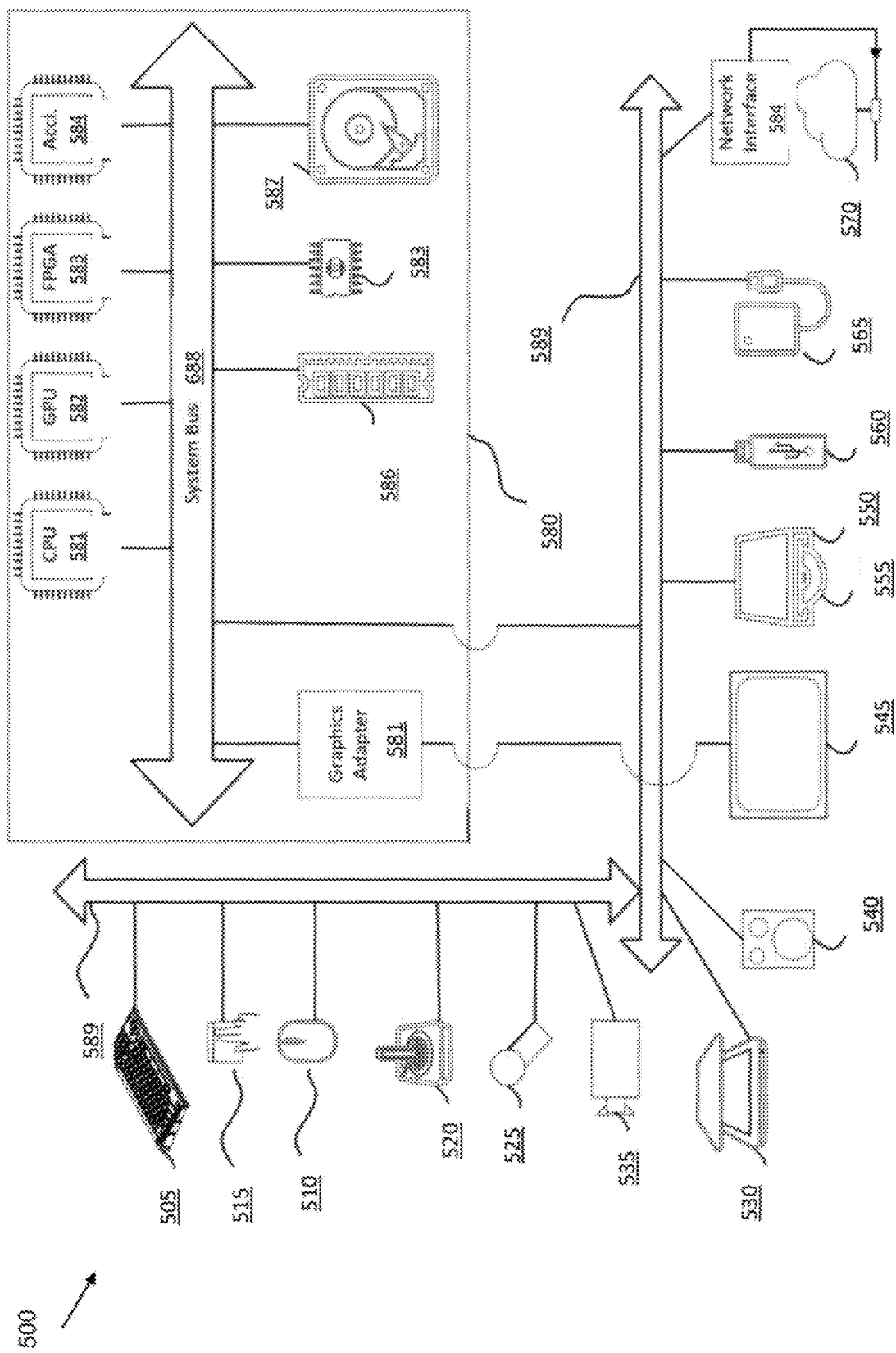
FIG. 5 is a diagram of a computer system, according to some embodiments.

The components shown in FIG. 5 for computer system 500 are exemplary and are not intended to suggest any limitation as to the scope of use or functionality of the computer software implementing embodiments of the present disclosure. Likewise the configuration of components should not be limited to be interpreted as having any dependency or requirement relating to any one or combination of components illustrated in the exemplary embodiment of a computer system 500.

Computer system 500 may include certain human interface input devices. Such a human interface input device may be responsive to input by one or more human users through, for example, tactile input (such as keystrokes, swipes, data glove movements), audio input (such as voice, clapping), visual input (such as gestures), olfactory input (not depicted). The human interface devices may also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 505, mouse 510, trackpad 515, touch screen 545, data-glove (not depicted), joystick 520, microphone 525, scanner 530, camera 535.

Computer system 500 may also include certain human interface output devices. Such human interface output devices may be stimulating the senses of one or more human users through, for example, tactile output, sound, light, and smell/taste. As such, the human interface output devices may include tactile output devices (for example, tactile feedback by the touch-screen 545, data-glove (not depicted), or joystick 520, but there may also be tactile feedback devices that do not serve as input devices), audio output devices (such as speakers 540, headphones (not depicted)), visual output devices (such as screens 545 to include CRT screens, LCD screens, plasma screens, OLED screens, each with or without touch-screen input capability, each with or without tactile feedback capability-some of which may be capable to output two-dimensional visual output or more than three-dimensional output through means such as stereographic output; virtual-reality glasses (not depicted), holographic displays and smoke tanks (not depicted)), and printers (not depicted).

Computer system 500 may also include human accessible storage devices and their associated media such as optical media including CD/DVD ROM/RW Z20 with CD/DVD or the like media 555, thumb-drive 560, removable hard drive or solid-state drive 565, legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system 500 may also include an interface to one or more communication networks. Networks can, for example, be wireless, wireline, optical. Networks may further be local, wide-area, metropolitan, vehicular, and industrial, real-time, delay-tolerant, and so on. Examples of networks include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks commonly require external network interface adapters that are attached to certain general-purpose data ports or peripheral buses 589, for example, USB ports of the computer system 500; others are commonly integrated into the core of the computer system 500 by attachment to a system bus as described below (for example Ethernet interface into a PC computer system or cellular network interface into a smartphone computer system). Using any of these networks, the computer system 500 may communicate with other entities. The communication may be uni-directional, receive only (for example, broadcast TV), uni-directional send-only (for example, CANbus to certain CANbus devices), or bi-directional, for example, to other computer systems using local or wide area digital networks. Certain protocols and protocol stacks may also be used on each of those networks and network interfaces, as described above.

The aforementioned human interface devices, human-accessible storage devices, and network interfaces may be attached to a core 580 of the computer system 500.

The core 580 may include one or more Central Processing Units (CPU) 581, Graphics Processing Units (GPU) 582, specialized programmable processing units in the form of Field Programmable Gate Areas (FPGA) 583, hardware accelerators for certain tasks 584, and so forth. These devices, along with Read-only memory (ROM) 585, Random-access memory 586, internal mass storage such as internal non-user accessible hard drives, SSDs, and the like 587, may be connected through a system bus 588. In some computer systems, the system bus 588 may be accessible in the form of one or more physical plugs to enable extensions by additional CPUs, GPU, and the like. The peripheral devices may also be attached either directly to the core's system bus 588 or through a peripheral bus 589. Architectures for a peripheral bus include PCI, USB, and the like.

CPUs 581, GPUs 582, FPGAs 583, and accelerators 584 may execute certain instructions that, in combination, may make up the aforementioned computer code. Such computer code may be stored in RAM 586. Transitional data may also be stored in RAM 586, whereas permanent data may be stored, for example, in the internal mass storage 587. Fast storage and retrieval to any of the memory devices may be enabled through the use of cache memory, which may be closely associated with one or more CPU 581, GPU 582, mass storage 587, ROM 585, RAM 586, and the like.

The computer-readable media may have computer code thereon for performing various computer-implemented operations. The media and computer code may be specially designed and constructed for the purposes of the present disclosure, or they may be of the kind well known and available to those having skill in the computer software arts.

As an example, and not by way of limitation, an architecture corresponding to computer system 500, and specifically the core 580, may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 580 that are of non-transitory nature, such as core-internal mass storage 587 or ROM 585. The software implementing various embodiments of the present disclosure may be stored in such devices and executed by core 580. A computer-readable medium may include one or more memory devices or chips, according to particular needs. The software may cause the core 580 and specifically the processors therein (including CPU, GPU, FPGA, and the like) to execute particular processes or particular parts of particular processes described herein, including defining data structures stored in RAM 586 and modifying such data structures according to the processes defined by the software. In addition, or as an alternative, the computer system may provide functionality as a result of logic hardwired or otherwise embodied in a circuit (for example, accelerator 584), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method executed by at least one processor, the method comprising:
   extracting scene file data from a scene file;
   translating, by a converter, the scene file data into a format compatible with a rendering engine; and
   mapping the translated scene file data into a scene representation compatible with an Immersive Technologies Media Format (ITMF) and arranged based on any of scene representation classes and equivalent to the translated scene file data according to one or more converter engines implementing at least part of mapping the translated scene file data into the scene representation.

2. The method according to claim 1, further comprising arranging the scene file data into various ones of the scene representation classes which are compatible with the rendering engine using an Immersive Technologies Media Format (ITMF) scene graph.

3. The method according to claim 2, wherein the scene file data comprises scene assets, materials, geometry, rendering path, and scene elements.

4. The method according to claim 2, wherein the rendering engine is an unreal engine.

5. The method according to claim 2, wherein the ITMF scene graph includes a node-based, directed acyclic graph that describes temporal, and spatial relationships between a plurality of visual objects in the scene file.

6. The method according to claim 4, wherein the ITMF scene graph is expressed as a human-readable XML file.

7. The method according to claim 4, wherein the ITMF scene graph supports both legacy and emerging advanced imaging display technologies.

8. The method according to claim 2, further comprising:
   referencing scene assets by the ITMF scene graph;
   aggregating the scene assets referenced by the ITMF scene graph with a human-readable XML file; and
   storing the aggregated scene assets and the human-readable XML file into an ITMF container.

9. An apparatus comprising:
   at least one memory configured to store program code; and
   at least one processor configured to read the program code and operate as instructed by the program code, the program code comprising:
     extracting code configured to cause the at least one processor to extract scene file data from a scene file;
     translating code configured to cause the at least one processor to translate, by a converter, the scene file data into a format compatible with a rendering engine; and
     mapping code configured to cause the at least one processor to map the translated scene file data into a scene representation compatible with an Immersive Technologies Media Format (ITMF) and arranged based on any of scene representation classes and equivalent to the translated scene file data according to one or more converter engines implementing at least part of mapping the translated scene file data into the scene representation.

10. The apparatus according to claim 9, wherein the program code further comprises arranging code configured to cause the at least one processor to arrange the scene file data into various ones of the scene representation classes which are compatible with the rendering engine using an Immersive Technologies Media Format (ITMF) scene graph.

11. The apparatus according to claim 10, wherein the extracted relevant scene file data comprises scene assets, materials, geometry, rendering path, and scene elements.

12. The apparatus according to claim 10, wherein the respective engine is an unreal engine.

13. The apparatus according to claim 10, wherein the ITMF scene graph includes a node-based, directed acyclic graph that describes temporal, and spatial relationships between a plurality of visual objects in the scene file.

14. The apparatus according to claim 12, wherein the ITMF scene graph is expressed as a human-readable XML file.

15. The apparatus according to claim 12, wherein the ITMF scene graph supports both legacy and emerging advanced imaging display technologies.

16. The apparatus according to claim 9, wherein the program code further includes:
   referencing code configured to cause the at least one processor to reference scene assets by the ITMF scene graph;

aggregating code configured to cause the at least one processor to aggregate the scene assets referenced by the ITMF scene graph with a human-readable XML file; and storing code configured to cause the at least one processor to store the aggregated scene assets and the human-readable XML file into an ITMF container.

17. A non-transitory computer-readable storage medium, storing instructions, which, when executed by at least one processor, cause the at least one processor to:

extract scene file data from a scene file;

translate, by a converter, the scene file data into a format compatible with a rendering engine; and map the translated scene file data into a scene representation compatible with an Immersive Technologies Media Format (ITMF) and arranged based on any of scene representation classes and equivalent to the translated scene file data according to one or more converter engines implementing at least part of mapping the translated scene file data into the scene representation.

18. The non-transitory computer-readable storage medium according to claim 17, wherein the instruction further cause the at least one processor to arrange the scene file data into various ones of the scene representation classes which are compatible with the rendering engine using an Immersive Technologies Media Format (ITMF) scene graph.

19. The non-transitory computer-readable storage medium according to claim 17, wherein the extracted relevant scene file data comprises scene assets, materials, geometry, rendering path, and scene elements.

20. The non-transitory computer-readable storage medium according to claim 17, wherein the rendering engine is an unreal engine.

* * * * *